US006893577B2

(12) United States Patent
Chen et al.

(10) Patent No.: US 6,893,577 B2
(45) Date of Patent: May 17, 2005

(54) METHOD OF FORMING SUBSTRATE FOR FLUID EJECTION DEVICE

(75) Inventors: Chien-Hua Chen, Corvallis, OR (US); Kenneth Michael Kramer, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 158 days.

(21) Appl. No.: 10/374,033

(22) Filed: Feb. 25, 2003

(65) Prior Publication Data

US 2003/0202049 A1 Oct. 30, 2003

Related U.S. Application Data

(62) Division of application No. 10/135,297, filed on Apr. 30, 2002, now Pat. No. 6,554,403.

(51) Int. Cl.[7] ........................ G01D 15/00; G11B 5/127

(52) U.S. Cl. ............................... 216/27; 216/2; 438/21; 29/890.1

(58) Field of Search ................................ 216/2, 27, 46; 29/890.1; 438/21; 347/20, 40, 44, 47, 54, 65, 71

(56) References Cited

U.S. PATENT DOCUMENTS 5,124,717 A 6/1992 Campanelli et al.
5,141,596 A 8/1992 Hawkins et al.
5,385,635 A 1/1995 O'Neil
5,387,314 A 2/1995 Baughman et al.
5,393,711 A 2/1995 Biallas et al.
5,441,593 A 8/1995 Baughman et al.
5,498,312 A 3/1996 Laermer et al.
5,501,893 A 3/1996 Laermer et al.
5,526,454 A 6/1996 Mayer
5,541,140 A 7/1996 Goebel et al.
5,716,533 A 2/1998 O'Neill et al.
5,756,901 A 5/1998 Kurle et al.
5,870,123 A 2/1999 Lorenze, Jr. et al.
6,008,138 A 12/1999 Laermer et al.
6,045,710 A 4/2000 Silverbrook (Continued)

FOREIGN PATENT DOCUMENTS

DE 19538103 A1 4/1997
EP 0865151 A2 9/1998
EP 0886307 A2 12/1998
EP 0978832 A2 2/2000
GB 2245366 A 1/1992
GB 2290413 A 12/1995
GB 2341348 A 3/2000
WO WO 9837577 8/1998
WO WO 9936948 A1 * 7/1999 ........... H01L/21/00
WO WO 0023376 4/2000

OTHER PUBLICATIONS

"Cryogenic Etching of Deep Narrow Trenches in Silicon"; by: Aachboun et al.; Journal of Vacuum Science & Technology A; vol. 18, No. 4; pt. 1–2; Jul.–Aug. 2000; Abstract Only.

(Continued)

*Primary Examiner*—Gregory Mills
*Assistant Examiner*—Roberts Culbert

(57) ABSTRACT

A method of forming an opening through a substrate having a first side and a second side opposite the first side includes extending spaced etch stops into the substrate from the first side, etching into the substrate between the spaced etch stops, and etching into the substrate from the second side toward the first side to the spaced etch stops. Etching into the substrate between the spaced etch stops includes forming a first portion of the opening and etching into the substrate to the spaced etch stops includes forming a second portion of the opening.

39 Claims, 12 Drawing Sheets

U.S. PATENT DOCUMENTS

| | | | | | |
|---|---|---|---|---|---|
| 6,081,635 | A | | 6/2000 | Hehmann | |
| 6,096,656 | A | | 8/2000 | Matzke et al. | |
| 6,126,846 | A | * | 10/2000 | Silverbrook | 216/27 |
| 6,139,761 | A | | 10/2000 | Ohkuma | |
| 6,217,155 | B1 | * | 4/2001 | Silverbrook | 347/56 |
| 6,305,080 | B1 | | 10/2001 | Komuro et al. | |
| 6,557,967 | B1 | * | 5/2003 | Lee | 347/20 |
| 2002/0046985 | A1 | * | 4/2002 | Daneman et al. | 216/2 |
| 2003/0197762 | A1 | * | 10/2003 | Park et al. | 347/65 |
| 2003/0201245 | A1 | * | 10/2003 | Chen et al. | 216/27 |

OTHER PUBLICATIONS

"An Array of Hollow Microcapillaries For The Controlled Injection of Genetic Materials Into Animal/Plant Cells"; by: K. Chun et al.; Proceedings of the 12th International Workshop on Micro Electro Mechanical Systems (MEMS); Jan. 1999; Abstract Only.

"Deep Etching Key to the MEMS/MST Revolution"; by: Prashant Gadil; R & D; Jul. 1998; p. 38.

"Anisotropic Silicon Etch Characterization in the TFTL STS Etcher"; Aug. 20, 1999; pp. 1–5.

"Etching Characteristics And Profile Control in a Time Multiplexed Inductively Coupled Plasma Etcher"; by: AA Ayon, CC Lin, RA Braff, & MA Schmidt of the Department of Electrical Engineering and Computer Science (EECS); Solid–State Sensor and Actuator Workshop, Hilton Head Island, SC; Jun. 8–11, 1998; pp. 41–44.

"Characterization of a Time Multiplexed Inductively Coupled Plasma Etcher"; by: AA Ayon, R Braff, CC Lin, HH Saw in & MA Schmidt; Journal of the Electrochemical Society; 146 (1); 1999; pp. 339–349.

STS–Surface Technology Systems–1st ASE User Meeting, pp. 1–10; Advanced Silicon Etch, pp. 1–28; Technology Review, pp. 1–10; California, 1997.

"High–Aspect–Ratio Si Etching for Microsensor Fabrication"; by: WH Juan & SW Pang; Journal of Vacuum Science and Technology A; vol. 13, No. 3; 1995; pp. 834–838.

"Bosch Deep Silicon Etching: Improved Uniformity and Etch Rate for Advanced MEMS Applications"; by: F Laermer et al.; 0–7803–5194–00; 1999; pp. 211–216.

"Advanced Silicon Etching Using High Density Plasmas"; by: JK Bhardwaj & H Ashraf; SPIE–Society of Photo–Optical Instrumentation Engineers; vol. 2639; Oct. 1995; pp. 224–233.

"Recent Advances is Silicon Etching for MEMS Using the ASE Process"; by: AM Hynes et al.; Sensors and Actuators; vol. 74; 1999; pp. 1,3–17.

"Fabrication of Thick Silicon Dioxide Layers Using DRIE, Oxidation of Trench Refill"; by: C Zhang & K Najafi; Proceedings of the 15th IEEE International Conference on Micro Electro Mechanical Systems; Jan. 20–24, 2002; pp. 160–163.

"Fabrication of Out–of–Plane Curveo Surfaces in SI by Utilizing RIE Lag"; by: TA Chou & K Najafi; Proceedings of the 15th IEEE International Conference on Micro Electro Mechanical Systems; Jan. 20–24, 2002; pp. 145–148.

* cited by examiner

METHOD OF FORMING SUBSTRATE FOR FLUID EJECTION DEVICE

This is a division of Ser. No. 10/135,297 Apr. 30, 2002 now U.S. Pat. No. 6,554,403.

THE FIELD OF THE INVENTION

The present invention relates generally to fluid ejection devices, and more particularly to a substrate for a fluid ejection device.

BACKGROUND OF THE INVENTION

In some fluid ejection devices, such as printheads, a drop ejecting element is formed on a front side of a substrate and fluid is routed to an ejection chamber of the drop ejecting element through an opening or slot in the substrate. Often, the substrate is a silicon wafer and the slot is formed in the wafer by chemical etching. Existing methods of forming the slot through the substrate include etching into the substrate from both the front side and the backside thereof so as to form a front side opening and a backside opening in the substrate.

Unfortunately, since a portion of the slot is formed by etching into the substrate from the front side and a portion of the slot is formed by etching into the substrate from the backside, misalignment between the backside opening and the front side opening of the slot may occur. Such misalignment may result, for example, in undercutting of one or more layers formed on the front side of the substrate.

Accordingly, it is desired to accommodate misalignment between the backside opening and the front side opening of the slot through the substrate.

SUMMARY OF THE INVENTION

One aspect of the present invention provides a method of forming an opening through a substrate having a first side and a second side opposite the first side. The method includes extending spaced etch stops into the substrate from the first side, etching into the substrate between the spaced etch stops, and etching into the substrate from the second side toward the first side to the spaced etch stops. Etching into the substrate between the spaced etch stops includes forming a first portion of the opening and etching into the substrate to the spaced etch stops includes forming a second portion of the opening.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as “top,” “bottom,” “front,” “back,” “leading,” “trailing,” etc., is used with reference to the orientation of the Figure(s) being described. Because components of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
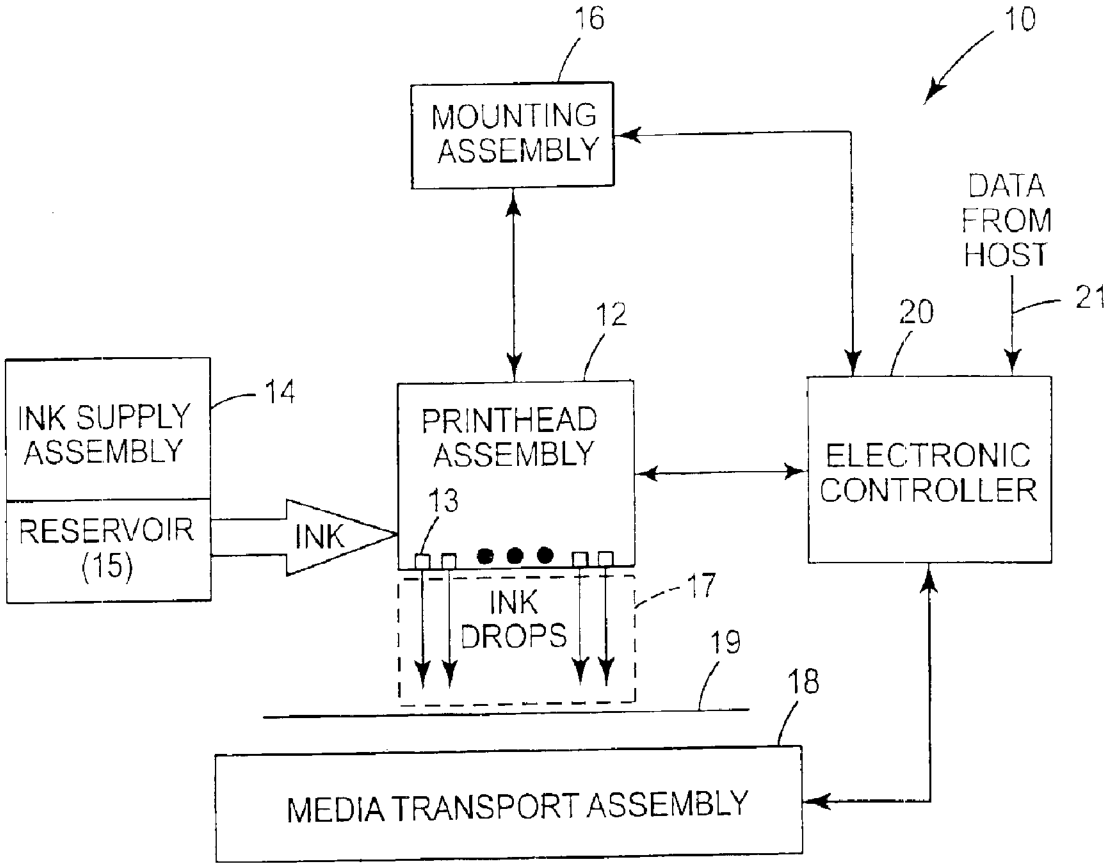
FIG. 1 is a block diagram illustrating one embodiment of an inkjet printing system according to the present invention.

FIG. 1 illustrates one embodiment of an inkjet printing system 10 according to the present invention. Inkjet printing system 10 constitutes one embodiment of a fluid ejection system which includes a fluid ejection assembly, such as an inkjet printhead assembly 12, and a fluid supply assembly, such as an ink supply assembly 14. In the illustrated embodiment, inkjet printing system 10 also includes a mounting assembly 16, a media transport assembly 18, and an electronic controller 20. Inkjet printhead assembly 12, as one embodiment of a fluid ejection assembly, is formed according to an embodiment of the present invention, and includes one or more printheads or fluid ejection devices which eject drops of ink or fluid through a plurality of orifices or nozzles 13. In one embodiment, the drops are directed toward a medium, such as print medium 19, so as to print onto print medium 19. Print medium 19 is any type of suitable sheet material, such as paper, card stock, transparencies, Mylar, and the like. Typically, nozzles 13 are arranged in one or more columns or arrays such that properly sequenced ejection of ink from nozzles 13 causes, in one embodiment, characters, symbols, and/or other graphics or images to be printed upon print medium 19 as inkjet printhead assembly 12 and print medium 19 are moved relative to each other.

Ink supply assembly 14, as one embodiment of a fluid supply assembly, supplies ink to printhead assembly 12 and includes a reservoir 15 for storing ink. As such, in one embodiment, ink flows from reservoir 15 to inkjet printhead assembly 12. In this embodiment, ink supply assembly 14 and inkjet printhead assembly 12 can form either a one-way ink delivery system or a recirculating ink delivery system. In a one-way ink delivery system, substantially all of the ink supplied to inkjet printhead assembly 12 is consumed during printing. In a recirculating ink delivery system, however, only a portion of the ink supplied to printhead assembly 12 is consumed during printing. As such, a portion of the ink not consumed during printing is returned to ink supply assembly 14.

In one embodiment, inkjet printhead assembly 12 and ink supply assembly 14 are housed together in an inkjet or fluidjet cartridge or pen. In another embodiment, ink supply assembly 14 is separate from inkjet printhead assembly 12 and supplies ink to inkjet printhead assembly 12 through an interface connection, such as a supply tube. In either embodiment, reservoir 15 of ink supply assembly 14 may be removed, replaced, and/or refilled. In one embodiment, where inkjet printhead assembly 12 and ink supply assembly 14 are housed together in an inkjet cartridge, reservoir 15 includes a local reservoir located within the cartridge and/or a larger reservoir located separately from the cartridge. As such, the separate, larger reservoir serves to refill the local reservoir. Accordingly, the separate, larger reservoir and/or the local reservoir may be removed, replaced, and/or refilled.

Mounting assembly 16 positions inkjet printhead assembly 12 relative to media transport assembly 18 and media transport assembly 18 positions print medium 19 relative to inkjet printhead assembly 12. Thus, a print zone 17 is defined adjacent to nozzles 13 in an area between inkjet printhead assembly 12 and print medium 19. In one embodiment, inkjet printhead assembly 12 is a scanning type printhead assembly. As such, mounting assembly 16 includes a carriage for moving inkjet printhead assembly 12 relative to media transport assembly 18 to scan print medium 19. In another embodiment, inkjet printhead assembly 12 is a non-scanning type printhead assembly. As such, mounting assembly 16 fixes inkjet printhead assembly 12 at a prescribed position relative to media transport assembly 18. Thus, media transport assembly 18 positions print medium 19 relative to inkjet printhead assembly 12.

Electronic controller 20 communicates with inkjet printhead assembly 12, mounting assembly 16, and media transport assembly 18. Electronic controller 20 receives data 21 from a host system, such as a computer, and includes memory for temporarily storing data 21. Typically, data 21 is sent to inkjet printing system 10 along an electronic, infrared, optical or other information transfer path. Data 21 represents, for example, a document and/or file to be printed. As such, data 21 forms a print job for inkjet printing system 10 and includes one or more print job commands and/or command parameters.

In one embodiment, electronic controller 20 provides control of inkjet printhead assembly 12 including timing control for ejection of ink drops from nozzles 13. As such, electronic controller 20 defines a pattern of ejected ink drops which form characters, symbols, and/or other graphics or images on print medium 19. Timing control and, therefore, the pattern of ejected ink drops, is determined by the print job commands and/or command parameters. In one embodiment, logic and drive circuitry forming a portion of electronic controller 20 is located on inkjet printhead assembly 12. In another embodiment, logic and drive circuitry is located off inkjet printhead assembly 12.

Figure 2:
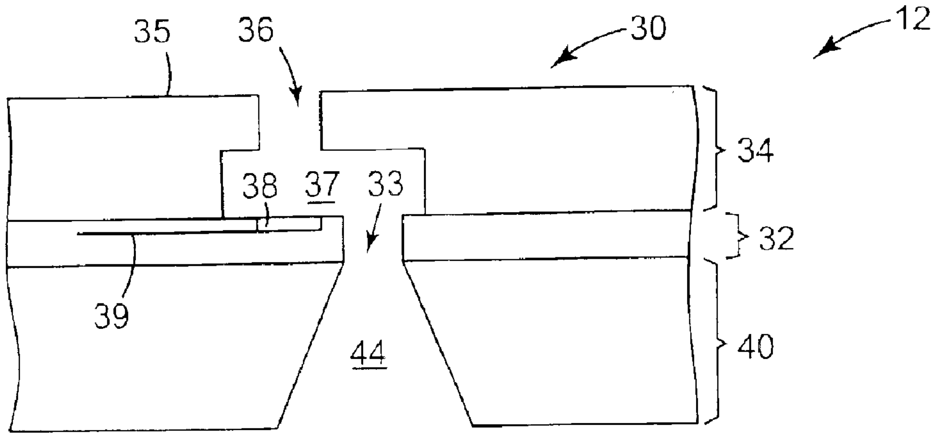
FIG. 2 is a schematic cross-sectional view illustrating one embodiment of a portion of a fluid ejection device according to the present invention.

FIG. 2 illustrates one embodiment of a portion of inkjet printhead assembly 12. Inkjet printhead assembly 12, as one embodiment of a fluid ejection assembly, includes an array of drop ejecting elements 30. Drop ejecting elements 30 are formed on a substrate 40 which has a fluid (or ink) feed slot 44 formed therein. As such, fluid feed slot 44 provides a supply of fluid (or ink) to drop ejecting elements 30.

In one embodiment, each drop ejecting element 30 includes a thin-film structure 32, an orifice layer 34, and a firing resistor 38. Thin-film structure 32 has a fluid (or ink) feed channel 33 formed therein which communicates with fluid feed slot 44 of substrate 40. Orifice layer 34 has a front face 35 and a nozzle opening 36 formed in front face 35. Orifice layer 34 also has a nozzle chamber 37 formed therein which communicates with nozzle opening 36 and fluid feed channel 33 of thin-film structure 32. Firing resistor 38 is positioned within nozzle chamber 37 and includes leads 39 which electrically couple firing resistor 38 to a drive signal and ground.

In one embodiment, during operation, fluid flows from fluid feed slot 44 to nozzle chamber 37 via fluid feed channel 33. Nozzle opening 36 is operatively associated with firing resistor 38 such that droplets of fluid are ejected from nozzle chamber 37 through nozzle opening 36 (e.g., normal to the plane of firing resistor 38) and toward a medium upon energization of firing resistor 38.

Example embodiments of inkjet printhead assembly 12 include a thermal printhead, a piezoelectric printhead, a flex-tensional printhead, or any other type of fluid ejection device known in the art. In one embodiment, inkjet printhead assembly 12 is a fully integrated thermal inkjet printhead. As such, substrate 40 is formed, for example, of silicon, glass, or a stable polymer, and thin-film structure 32 is formed by one or more passivation or insulation layers of silicon dioxide, silicon carbide, silicon nitride, tantalum, poly-silicon glass, or other suitable material. Thin-film structure 32 also includes a conductive layer which defines firing resistor 38 and leads 39. The conductive layer is formed, for example, by aluminum, gold, tantalum, tantalum-aluminum, or other metal or metal alloy.

Figure 3:
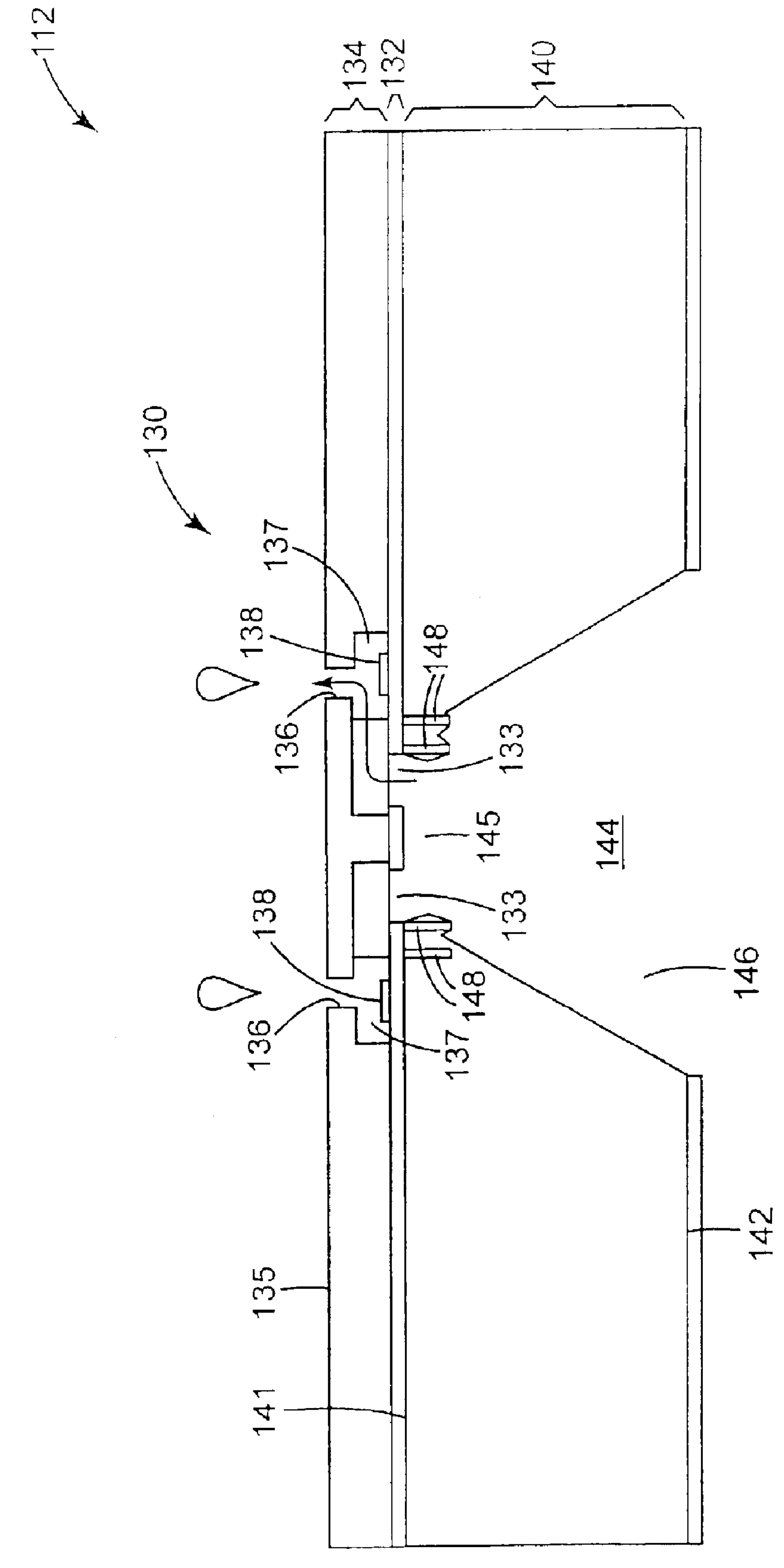
FIG. 3 is a schematic cross-sectional view illustrating one embodiment of a fluid ejection device formed on one embodiment of a substrate according to the present invention.

FIG. 3 illustrates another embodiment of a portion of inkjet printhead assembly 12. Inkjet printhead assembly 112, as another embodiment of a fluid ejection assembly, includes an array of drop ejecting elements 130. Drop ejecting elements 130 are formed on a substrate 140 which has a fluid (or ink) feed slot 144 formed therein. As such, fluid feed slot 144 provides a supply of fluid (or ink) to drop ejecting elements 130.

In one embodiment, drop ejecting elements 130 include a thin-film structure 132, an orifice layer 134, and firing resistors 138. Thin-film structure 132 has fluid (or ink) feed channels 133 formed therein which communicate with fluid feed slot 144 of substrate 140. Orifice layer 134 has a front face 135 and nozzle openings 136 formed in front face 135. Orifice layer 134 also has nozzle chambers 137 formed therein which communicate with respective nozzle openings 136 and respective fluid feed channels 133 of thin-film structure 132.

In one embodiment, during operation, fluid flows from fluid feed slot 144 to nozzle chambers 137 via respective fluid feed channels 133. Nozzle openings 136 are operatively associated with respective firing resistors 138 such that droplets of fluid are ejected from nozzle chambers 137 through nozzle openings 136 and toward a medium upon energization of firing resistors 138 positioned within respective nozzle chambers 137.

As illustrated in the embodiment of FIG. 3, substrate 140 has a first side 141 and a second side 142. Second side 142 is opposite of first side 141 and, in one embodiment, oriented substantially parallel with first side 141. Fluid feed slot 144 communicates with first side 141 and second side 142 of substrate 140 so as to provide a channel or passage through substrate 140.

In one embodiment, fluid feed slot 144 includes a first portion 145 and a second portion 146. First portion 145 is formed in and communicates with first side 141 of substrate 140 and second portion 146 is formed in and communicates with second side 142 of substrate 140. First portion 145 and second portion 146 communicate with each other so as to form fluid feed slot 144 through substrate 140. Fluid feed slot 144, including first portion 145 and second portion 146, is formed in substrate 140 according to an embodiment of the present invention. In one embodiment, fluid feed slot 144, including first portion 145 and second portion 146, is formed in substrate 140 by chemical etching, as described below.

In one embodiment, substrate 140 includes spaced stops 148. Stops 148 extend into substrate 140 from first side 141 and, in one embodiment, are oriented substantially perpendicular to first side 141. Stops 148 control etching of substrate 140 and, therefore, formation of first portion 145 and second portion 146 of fluid feed slot 144. As such, stops 148 are formed of a material which is resistant to etchant used for etching substrate 140, as described below. Thus, stops 148 constitute etch stops of substrate 140.

Stops 148 define and control formation of fluid feed slot 144 in substrate 140. More specifically, stops 148 limit fluid feed slot 144 and define a maximum dimension of first portion 145 and a minimum dimension of second portion 146 of fluid feed slot 144. In addition, stops 148 establish a location of first portion 145 at first side 141 and accommodate misalignment between second portion 146 and first portion 145, as described below. Furthermore, stops 148 provide for self-alignment between second portion 146 and first portion 145 of fluid feed slot 144.

FIGS. 4A–4H illustrate one embodiment of forming an opening 150 through a substrate 160. In one embodiment, substrate 160 is a silicon substrate and opening 150 is formed in substrate 160 by chemical etching, as described below. Substrate 160 has a first side 162 and a second side 164. Second side 164 is opposite of first side 162 and, in one embodiment, oriented substantially parallel with first side 162. Opening 150 communicates with first side 162 and second side 164 of substrate 160 so as to provide a channel or passage through substrate 160. While only one opening 150 is illustrated as being formed in substrate 160, it is understood that any number of openings 150 may be formed in substrate 160.

In one embodiment, substrate 160 represents substrate 140 of inkjet printhead assembly 112 and opening 150 represents fluid feed slot 144 formed in substrate 140. As such, drop ejecting elements 130 of inkjet printhead assembly 112 are formed on first side 162 of substrate 160. Thus, first side 162 forms a front side of substrate 160 and second side 164 forms a backside of substrate 160 such that fluid flows through opening 150 and, therefore, substrate 160 from the backside to the front side. Accordingly, opening 150 provides a fluidic channel for the communication of ink with drop ejecting elements 130 through substrate 160.

As illustrated in the embodiments of FIGS. 4A–4D, before opening 150 is formed, etch stops 170 are formed in substrate 160. In one embodiment, etch stops 170 are formed in substrate 160 by chemical etching into substrate 160 and disposing an etch resistant material in substrate 160, as described below.

Figure 4A:
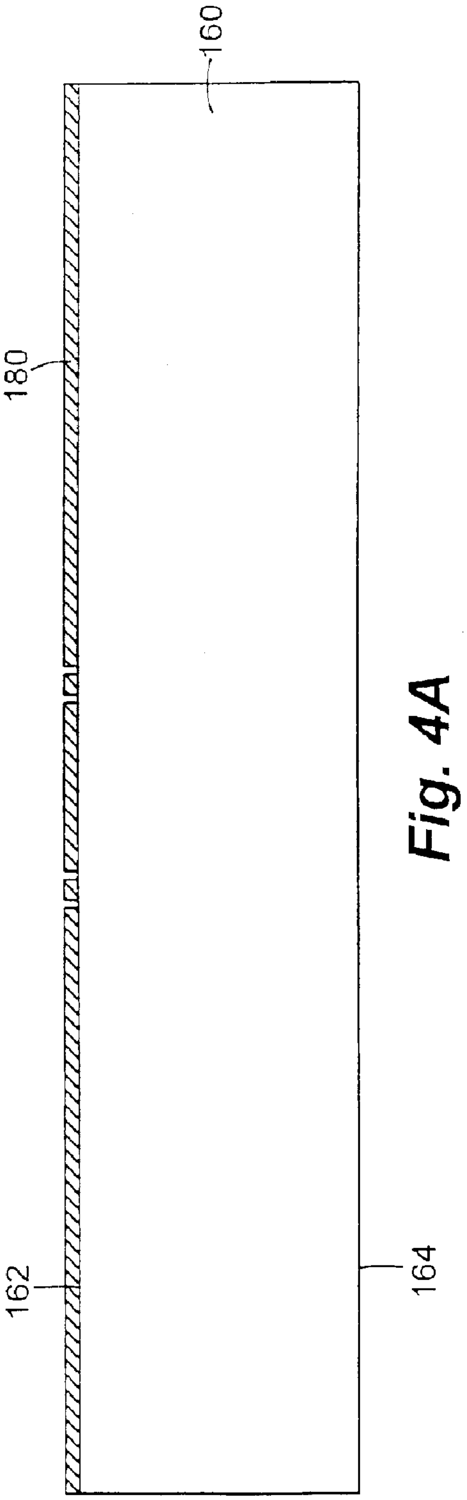
FIGS. 4A–4H illustrate one embodiment of forming an opening through a substrate according to the present invention.

In one embodiment, as illustrated in the embodiment of FIG. 4A, to form etch stops 170 in substrate 160, a masking layer 180 is formed on substrate 160. More specifically, masking layer 180 is formed on first side 162 of substrate 160. Masking layer 180 is used to selectively control or block etching of first side 162. As such, masking layer 180 is formed along first side 162 of substrate 160 and patterned to expose areas of first side 162 and define where etch stops 170 are to be formed in substrate 160.

In one embodiment, masking layer 180 is formed by deposition and patterned by photolithography and etching to define exposed portions of first side 162 of substrate 160. More specifically, masking layer 180 is patterned to outline where slots 166 (FIG. 4B) are to be formed in substrate 160 from first side 162. Preferably, slots 166 are formed in substrate 160 by chemical etching, as described below. Thus, masking layer 180 is formed of a material which is resistant to etchant used for etching slots 166 into substrate 160. Examples of a material suitable for masking layer 180 include silicon dioxide, silicon nitride, or photoresist.

Figure 4B:
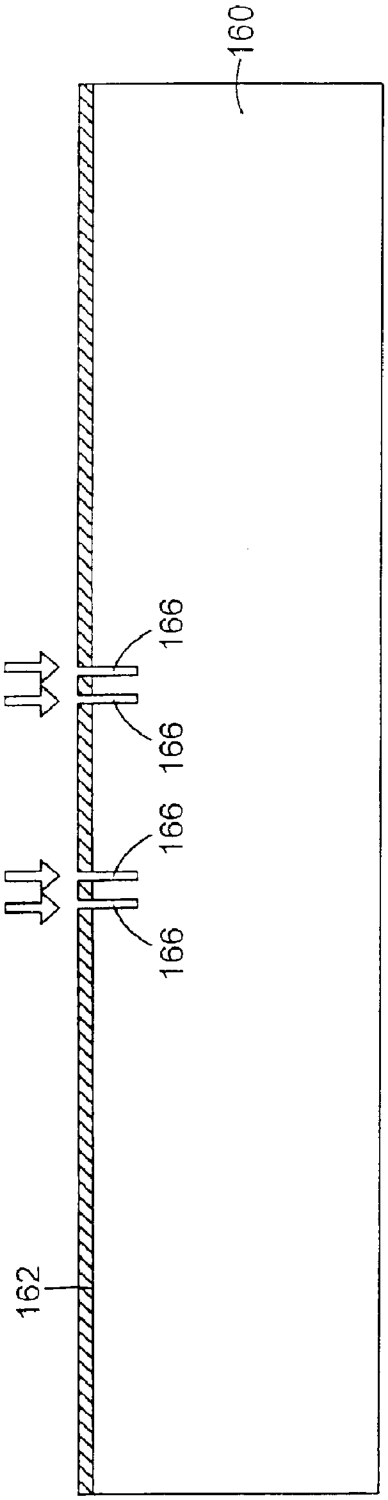

Next, as illustrated in the embodiment of FIG. 4B, slots 166 are formed in substrate 160. More specifically, slots 166 are formed in substrate 160 by etching into first side 162. Slots 166 include at least one pair of slots spaced along first side 162 so as to define where opening 150 is to communicate with first side 162. Preferably, slots 166 are oriented substantially perpendicular to first side 162 and are formed in substrate 160 using an anisotropic etch process which forms slots 166 with substantially parallel sides. In one embodiment, the etch process is a dry etch such as a plasma based fluorine ($SF_6$) etch. In a particular embodiment, the dry etch is a reactive ion etch (RIE) and, more specifically, a deep RIE (DRIE).

During the deep RIE, an exposed section is alternatively etched with a reactive etching gas and coated until a slot is formed. In one exemplary embodiment, the reactive etching gas creates a fluorine radical that chemically and/or physically etches the substrate. In this exemplary embodiment, a polymer coating that is selective to the etchant used is deposited on inside surfaces of the forming slot, including the sidewalls and bottom. The coating is created by using carbon-fluorine gas that deposits $(CF_2)_n$, a Teflon-like material or Teflon-producing monomer, on these surfaces. In this embodiment, the polymer substantially prevents etching of the sidewalls during the subsequent etch(es). The gases for the etchant alternate with the gases for forming the coating on the inside of the slots.

Figure 4C:
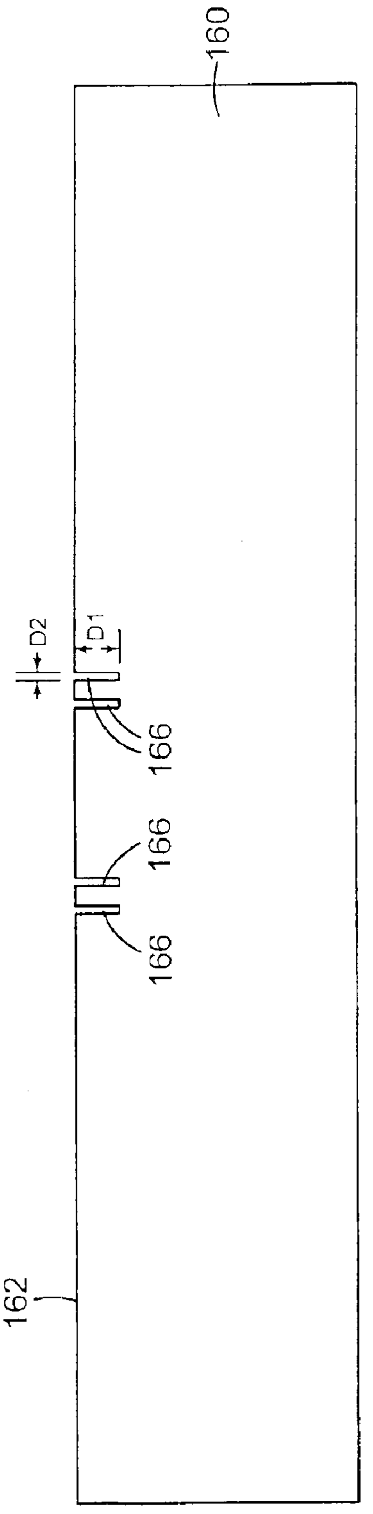

As illustrated in the embodiment of FIG. 4C, after slots 166 are formed in substrate 160, masking layer 180 is stripped or removed from substrate 160. As such, first side 162 of substrate 160 is revealed or exposed. In one embodiment, when masking layer 180 is formed of an oxide, masking layer 180 is removed, for example, by a chemical etch. In another embodiment, when masking layer 180 is formed of photoresist, masking layer 180 is removed, for example, by a resist stripper.

Figure 4D:
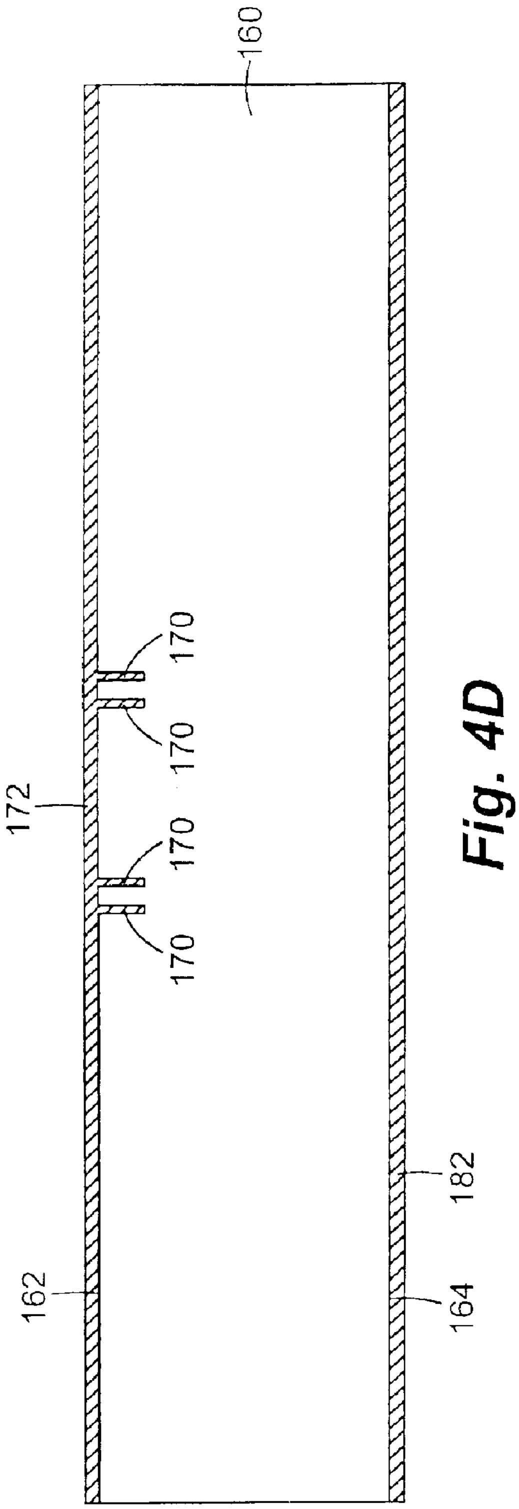

Next, as illustrated in the embodiment of FIG. 4D, etch stops 170 are formed in substrate 160 and a masking layer 182 is formed on second side 164 of substrate 160. Preferably, etch stops 170 are formed by disposing an etch resistant material in slots 166 of substrate 160. In one embodiment, forming of etch stops 170 in substrate 160 includes filling slots 166 and forming a layer 172 on first side 162 of substrate 160.

In one embodiment, etch stops 170 (including layer 172) and masking layer 182 are formed by growing an oxide on first side 162, including in slots 166, and on second side 164. As such, the oxide is grown so as to fill slots 166. The oxide is resistant to etchant selected for use in etching opening 150 through substrate 160, as described below. As such, the oxide may include, for example, silicon dioxide ($SiO_2$). In another embodiment, etch stops 170 are formed by filling slots 166 of substrate 160 with other materials which are resistant to the etchant selected for etching opening 150 through substrate 160. For example, slots 166 are filled with a conformal material which is deposited by chemical vapor deposition (CVD). Examples of such a material include tungsten, oxi-nitride, or silicon nitride.

In one embodiment, slots 166 and, therefore, etch stops 170 have a first dimension D1 and a second dimension D2. First dimension D1 is oriented substantially perpendicular to first side 162 and second dimension D2 is oriented substantially perpendicular to first dimension D1. Preferably, first dimension D1 is greater than second dimension D2.

Figure 4E:
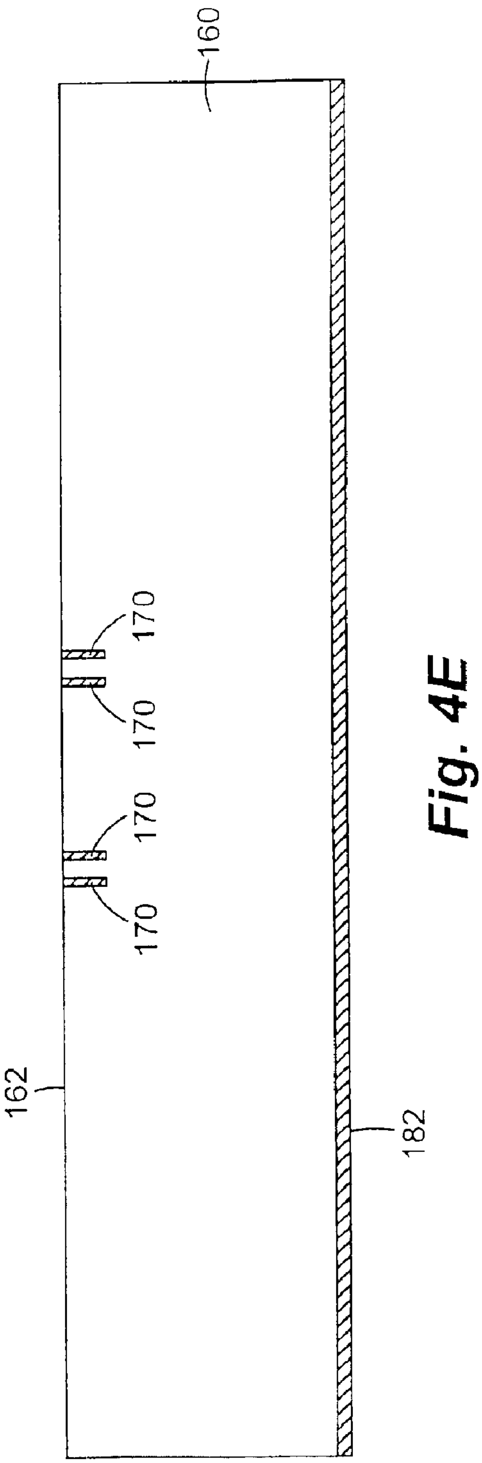

As illustrated in the embodiment of FIG. 4E, after etch stops 170 are formed in substrate 160, layer 172 is removed from first side 162. Layer 172 is removed, for example, by a buffered oxide etch (BOE) or chemo-mechanical polishing (CMP). Etch stops 170, however, remain buried in substrate 160. With layer 172 removed from first side 162, additional layers including, for example, thin-film structure 132 and orifice layer 134 may be formed on substrate 160.

Figure 4F:
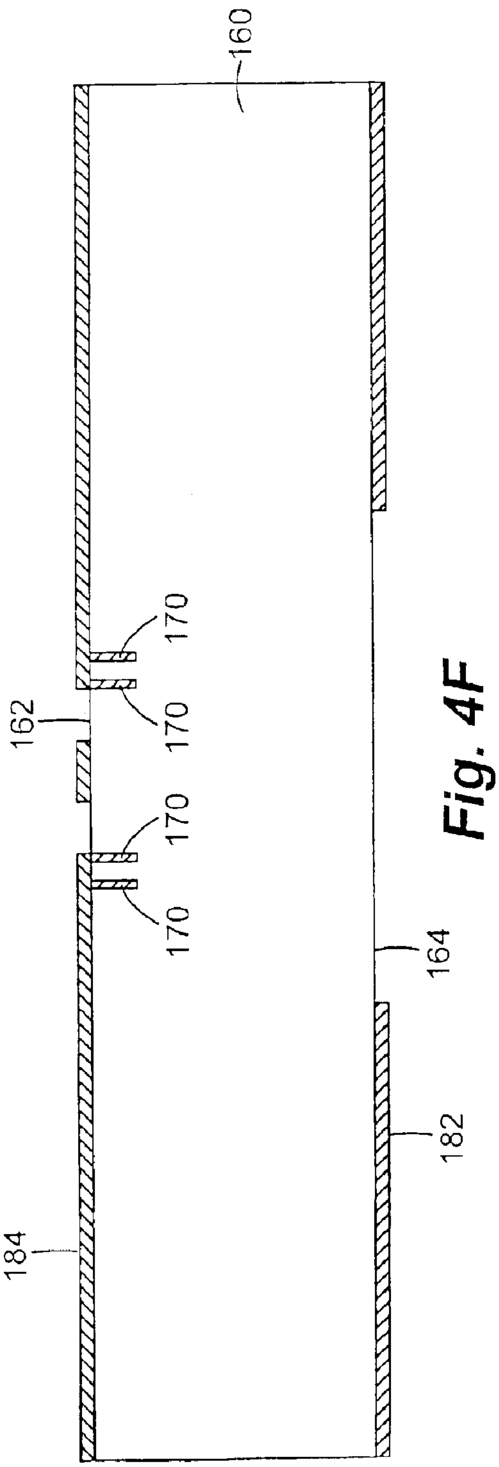
Figure 4G:
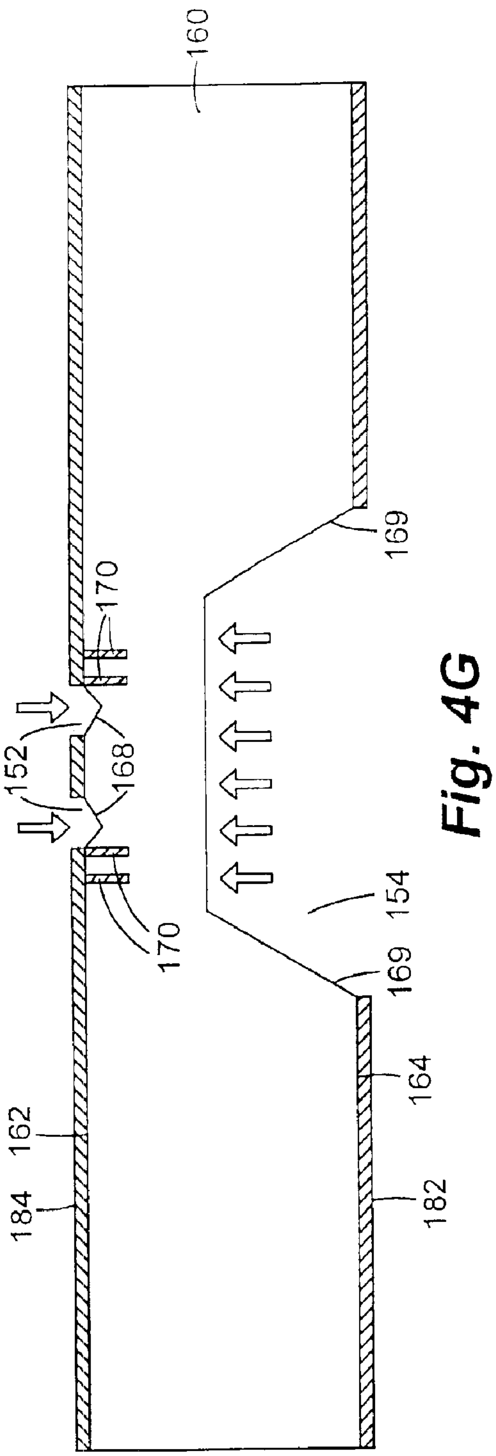
Figure 4H:
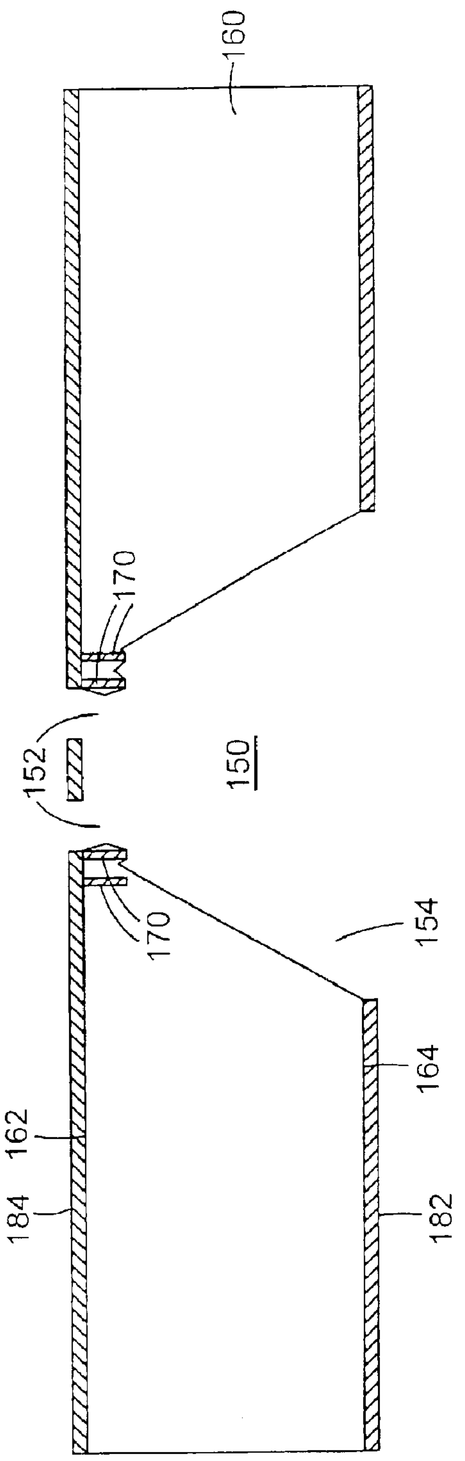

Next, as illustrated in the embodiment of FIG. 4F, a masking layer 184 is formed on first side 162 of substrate 160. As such, masking layer 184 is patterned to expose areas of first side 162 and define where substrate 160 is to be etched to form a first portion 152 of opening 150 (FIGS. 4G–4H). In addition, masking layer 182 formed on second side 164 of substrate 160 is patterned to expose an area of second side 164 and define where substrate 160 is to be etched to form a second portion 154 of opening 150 (FIGS. 4G–4H). Masking layer 184 may include one or more layers formed on first side 162 and, in one embodiment, includes thin-film structure 132. In addition, in one embodiment, masking layer 184 defines spaced fluid feed channels or holes which communicate with corresponding nozzle chambers 137 formed in orifice layer 134.

As illustrated in the embodiment of FIG. 4G, first portion 152 of opening 150 is etched into substrate 160 from first side 162 and second portion 154 of opening 150 is etched into substrate 160 from second side 164. As such, first portion 152 of opening 150 is formed by etching exposed portions or areas of substrate 160 from first side 162 toward second side 164 and second portion 154 of opening 150 is formed by etching an exposed portion or area of substrate 160 from second side 164 toward first side 162. Thus, first portion 152 of opening 150 and second portion 154 of opening 150 are simultaneously etched into substrate 160.

Preferably, opening 150, including first portion 152 and second portion 154, is formed using an anisotropic chemical etch process. More specifically, the chemical etch process is a wet etch process and uses a wet anisotropic etchant such as tetra-methyl ammonium hydroxide (TMAH), potassium hydroxide (KOH), or other alkaline etchant. As such, a geometry of opening 150 through substrate 160 is defined by crystalline planes of the silicon substrate. For example, first portion 152 of opening 150 follows crystalline planes 168 of substrate 160 and second portion 154 of opening 150 follows crystalline planes 169 of substrate 160.

In one embodiment, substrate 160 has a <100> Si crystal orientation and the wet anisotropic etches of first portion 152 and second portion 154 follow <111> Si planes of substrate 160. As such, crystalline planes 168 and 169 include <111> Si planes of substrate 160. Thus, sides of first portion 152 of opening 150 and sides of second portion 154 of opening 150 are oriented at angles of approximately 54 degrees to first side 162 and second side 164, respectively.

As illustrated in the embodiment of FIG. 4H, etching into substrate 160 from first side 162 toward second side 164 and/or from second side 164 toward first side 162 continues such that first portion 152 and second portion 154 of opening 150 connect or communicate. As such, opening 150 is formed through substrate 160.

FIGS. 5A–5D illustrate another embodiment of forming opening 150 through substrate 160. Before opening 150 is formed, etch stops 170 are formed in substrate 160, as described above with reference to FIGS. 4A–4D.

Figure 5A:
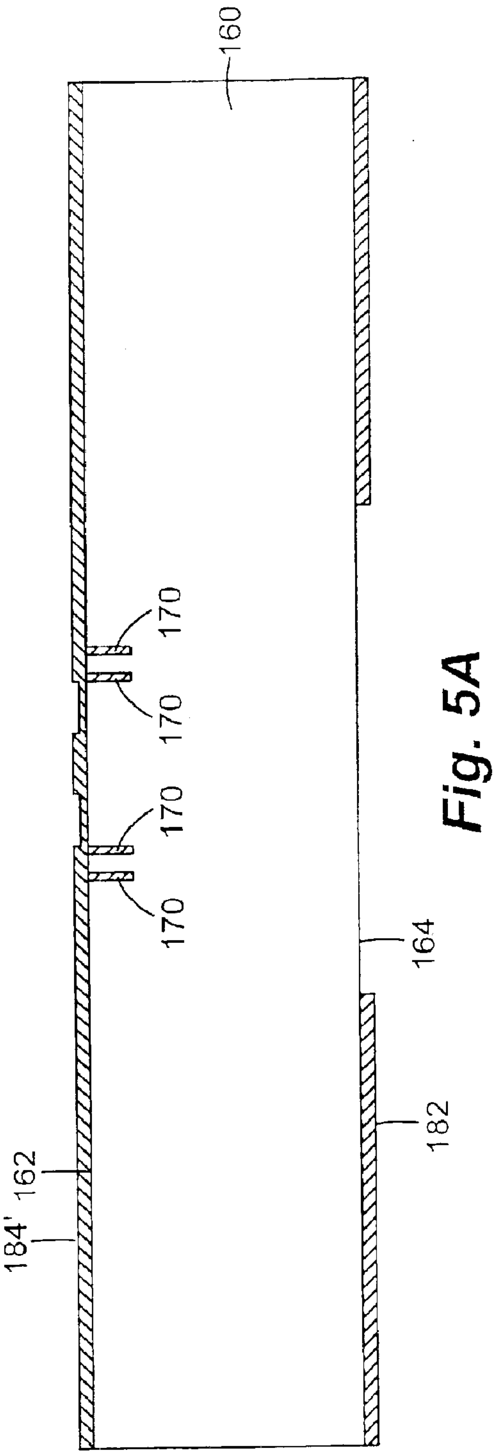
FIGS. 5A–5D illustrate another embodiment of forming an opening through a substrate according to the present invention.

As illustrated in the embodiment of FIG. 5A, after etch stops 170 are formed in substrate 160, a masking layer 184' is formed on first side 162 of substrate 160. While masking layer 182 formed on second side 164 of substrate 160 is patterned to expose an area of second side 164, as described above, masking layer 184' is not patterned to expose areas of first side 162. Rather, masking layer 184' forms a protective layer for first side 162 of substrate 160. An example of a material suitable for masking layer 184' includes tetraethylorthosilicate (TEOS).

Figure 5B:
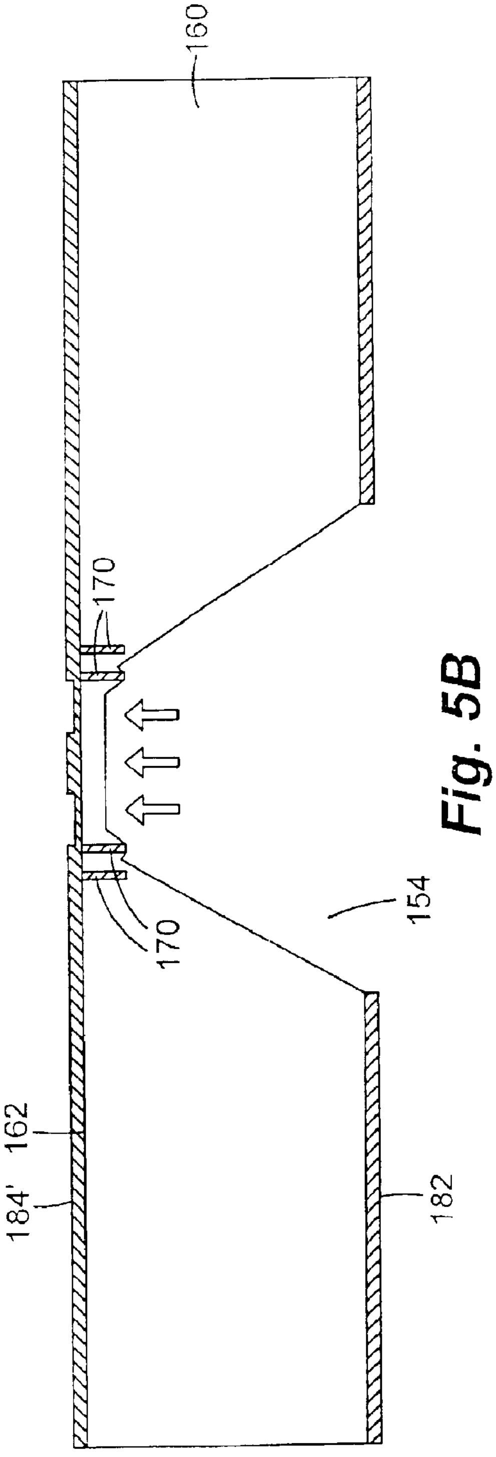

As illustrated in the embodiment of FIG. 5B, second portion 154 of opening 150 is etched into substrate 160 from second side 164. As such, second portion 154 of opening 150 is formed by etching an exposed portion or area of substrate 160 from second side 164 toward first side 162, as described above. Etching from second side 164 toward first side 162, however, continues to first side 162. Thus, a portion of first portion 152 is etched into substrate 160 from second side 164.

In one embodiment, as illustrated in the embodiments of FIGS. 5A and 5B, select portions of masking layer 184' have a reduced thickness in areas where opening 150 and, more specifically, first portion 152 of opening 150 is to communicate with first side 162. As such, etching into substrate 160 from second side 164 to first side 162 breaks through masking layer 184' in the areas of reduced thickness. These select portions of masking layer 184' are made thinner by, for example, a buffered oxide etch (BOE).

Figure 5C:
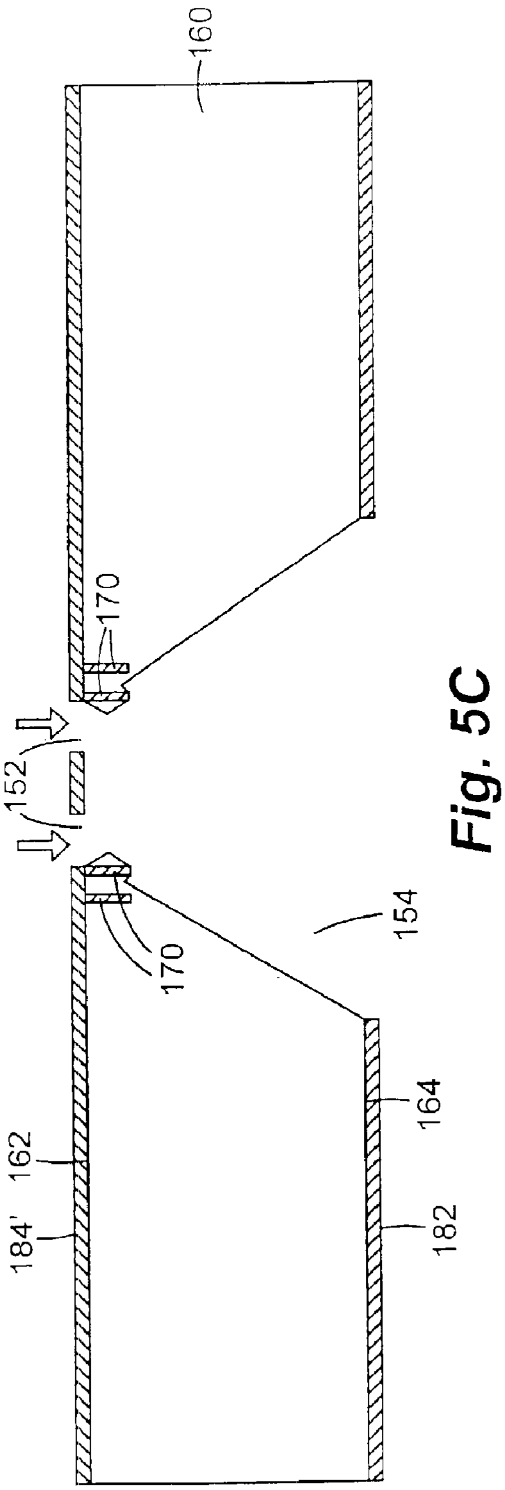

Next, as illustrated in the embodiment of FIG. 5C, first portion 152 of opening 150 is etched into substrate 160 from first side 162. More specifically, a remaining portion of first portion 152 of opening 150 is formed by etching substrate 160 from first side 162 toward second side 164. Before etching substrate 160 from first side 162, however, protective or masking layer 184' is etched in an area where opening 150 is to communicate with first side 162.

Figure 5D:
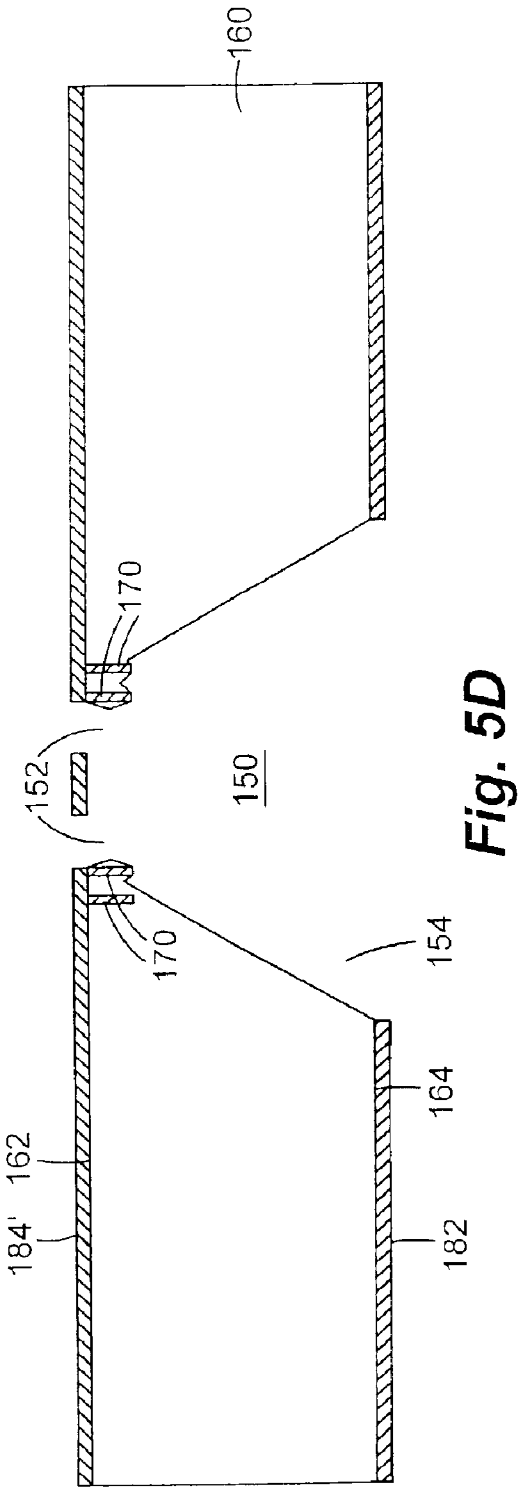

As illustrated in the embodiment of FIG. 5D, etching into substrate 160 from first side 162 toward second side 164 continues such that first portion 152 is formed. As such, opening 150 is formed through substrate 160. First portion 152 of opening 150, however, is etched into substrate 160 after second portion 154 of opening 150 is etched into substrate 160. Preferably, as described, opening 150, including first portion 152 and second portion 154, is formed using an anisotropic chemical etch process.

As described above, etch stops 170 are formed of a material resistant to the wet anisotropic etchant used to form first portion 152 and second portion 154. As such, etch stops 170 define a maximum dimension of first portion 152 and a minimum dimension of second portion 154, as described below. In addition, etch stops 170 establish a location of first portion 152 at first side 162 and accommodate misalignment between second portion 154 formed from second side 164 and first portion 152 formed from first side 162.

More specifically, when etching into substrate 160 from first side 162, etch stops 170 limit etching of substrate 160 to areas between etch stops 170 and prevent etching laterally of etch stops 170. As such, undercutting or etching into substrate 160 under the edges of masking layer 184 is avoided when etching into substrate 160 from first side 162. Thus, etch stops 170 define substantially vertical sidewalls of first portion 152 of opening 150 and control a width of opening 150 at first side 162. Etch stops 170, therefore, control where opening 150 communicates with first side 162.

Furthermore, when etching into substrate 160 from second side 164, etch stops 170 cause etching of second portion 154 to self-terminate. More specifically, when etching of second portion 154 reaches etch stops 170, etching of second portion 154 continues to follow the crystalline orientation or crystalline planes of substrate 160. For example, in one embodiment, as described above, etching of second portion 154 follows <111> Si planes of substrate 160. As such, when etching of second portion 154 reaches one or more etch stops 170, etching continues along <111> Si planes of substrate 160.

A depth at which etch stops 170 extend into substrate 160 from first side 162, however, is selected such that etching of second portion 154 toward first side 162 and beyond etch stops 170 self-terminates before reaching first side 162. As such, a portion of the bottom of second portion 154 of opening 150 has a saw-tooth profile. Thus, etch stops 170 provide for self-alignment between second portion 154 as formed from second side 164 and first portion 152 as formed from first side 162. More specifically, etch stops 170 accommodate misalignment between second portion 154 and first portion 152 by confining first portion 152 between spaced etch stops 170 and causing second portion 154 to self-terminate at etch stops 170. In addition, a dimension of first portion 152 of opening 150 is self-limiting and self-aligned by etch stops 170.

Figure 6:
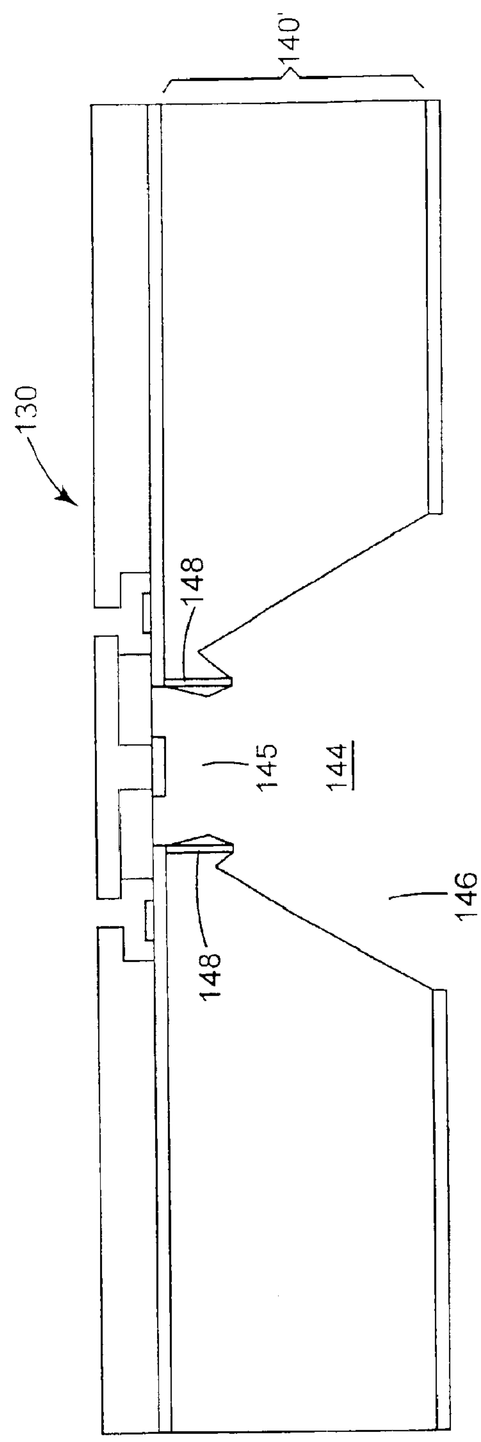
FIG. 6 is a schematic cross-sectional view illustrating one embodiment of a fluid ejection device formed on another embodiment of a substrate according to the present invention.

FIG. 6 illustrates another embodiment of substrate 140 with drop ejecting elements 130 formed thereon. Substrate 140', similar to substrate 140, has fluid feed slot 144, including first portion 145 and second portion 146, formed therein. While substrate 140 includes two pair of etch stops 148, namely two etch stops 148 on each side of first portion 145, substrate 140' includes one pair of etch stops 148, namely one etch stop 148 on each side of first portion 145. Etch stops 148 of substrate 140' are formed in substrate 140' in a manner similar to how etch stops 170 are formed in substrate 160, as described above.

Figure 7:
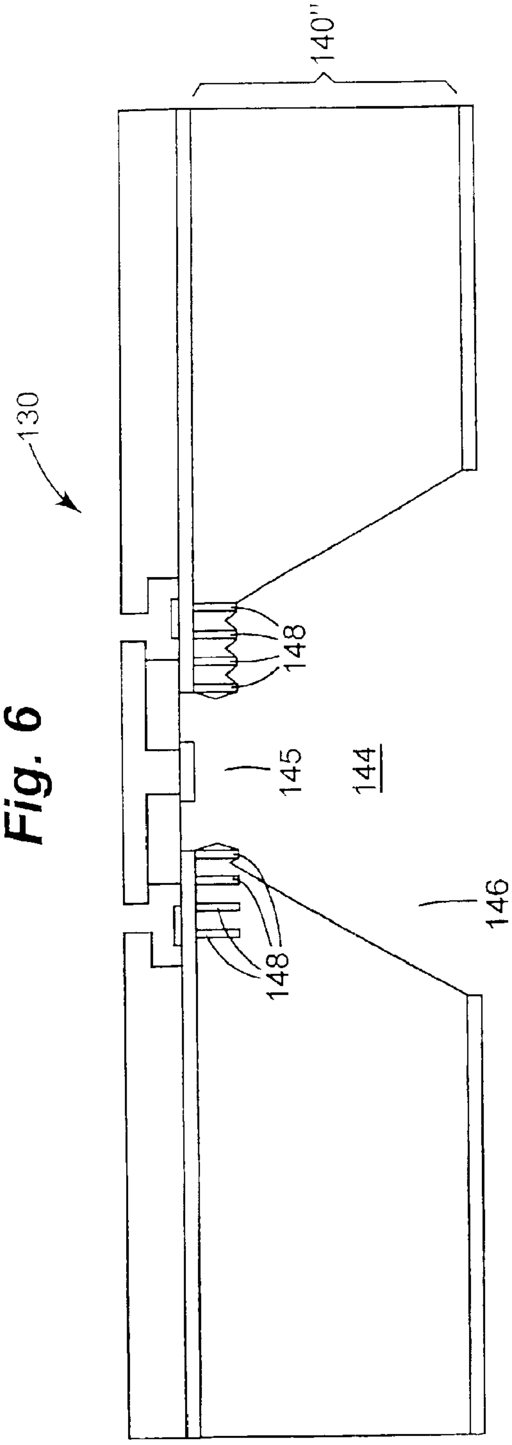
FIG. 7 is a schematic cross-sectional view illustrating one embodiment of a fluid ejection device formed on another embodiment of a substrate according to the present invention.

FIG. 7 illustrates another embodiment of substrate 140 with drop ejecting elements 130 formed thereon. Substrate 140", similar to substrate 140, has fluid feed slot 144, including first portion 145 and second portion 146, formed therein. While substrate 140 includes two pair of etch stops 148, namely two etch stops 148 on each side of first portion 145, substrate 140" includes multiple pairs of etch stops 148, namely multiple etch stops 148 on each side of first portion 145. Etch stops 148 of substrate 140" are formed in substrate 140" in a manner similar to how etch stops 170 are formed in substrate 160, as described above.

Figure 8:
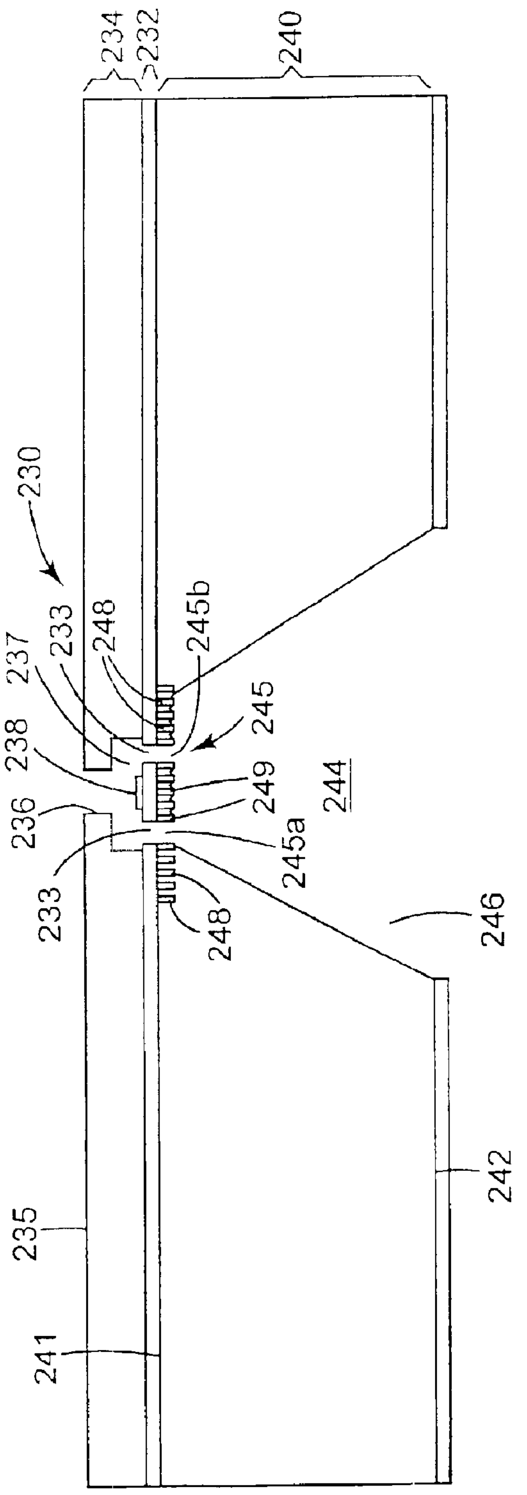
FIG. 8 is a schematic cross-sectional view illustrating another embodiment of a fluid ejection device formed on another embodiment of a substrate according to the present invention.
Figure 9:
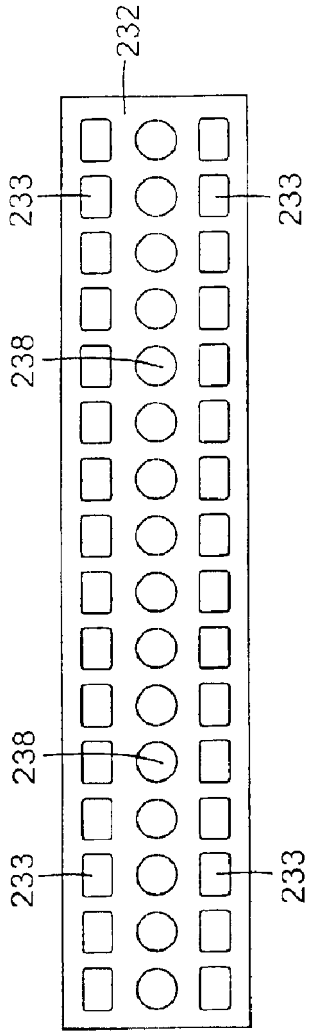
FIG. 9 is a schematic top view of a portion of the fluid ejection device of FIG. 8.

FIGS. 8 and 9 illustrate another embodiment of substrate 140 with another embodiment of drop ejecting elements 130 formed thereon. More specifically, drop ejecting elements 230 are formed on a substrate 240 which has a fluid (or ink) feed slot 244 formed therein. As such, fluid feed slot 244 provides a supply of fluid (or ink) to drop ejecting elements 230.

Similar to drop ejecting elements 130, drop ejecting elements 230 include a thin-film structure 232, an orifice layer 234, and a firing resistor 238. In addition, thin-film structure 232 has fluid (or ink) feed channels 233 formed therein which communicate with fluid feed slot 244 of substrate 240. Furthermore, orifice layer 234 has a front face 235 and a nozzle opening 236 formed in front face 235. Orifice layer 234, however, has a nozzle chamber 237 formed therein which communicates with nozzle opening 236 and fluid feed channels 233. Thus, during printing, fluid (or ink) flows from fluid feed slot 244 to nozzle chamber 237 via fluid feed channels 233.

Fluid feed slot 244 of substrate 240, similar to fluid feed slot 144 of substrate 140 (including substrates 140' and 140"), includes a first portion 245 and a second portion 246. First portion 245 of fluid feed slot 244 is formed in and communicates with a first side 241 of substrate 240 and second portion 246 of fluid feed slot 244 is formed in and communicates with a second side 242 of substrate 240. As such, first portion 245 and second portion 246 communicate with each other so as to form fluid feed slot 244 through substrate 240. First portion 245 of fluid feed slot 244, however, includes sub-portions **245*a* and 245*b*. As such, sub-portion 245*a* of first portion 245 communicates with one fluid feed channel 233 and sub-portion 245*b* of first portion 245 communicates with another fluid feed channel 233**.

Substrate 240, similar to substrate 140 (including substrates 140' and 140"), includes etch stops 248 which define and control formation of fluid feed slot 244 in substrate 240. More specifically, substrate 240 includes at least one pair of etch stops 248, including at least one etch stop 248 on each side of first portion 245 of fluid feed slot 244. As such, etch stops 248 establish a location of first portion 245 of fluid feed slot 244 at first side 241 and accommodate misalignment between second portion 246 and first portion 245.

Substrate 240, however, includes at least one etch stop 249 positioned between etch stops 248. As such, etch stop 249 prevents etching of a portion of substrate 240 between etch stops 248 at first side 241 of substrate 240. Thus, etch stop 249 divides first portion 245 of fluid feed slot 244 into sub-portions **245*a* and 245*b*. Etch stops 248 and 249 of substrate 240 are formed in substrate 240 in a manner similar to how etch stops 170 are formed in substrate 160, as described above In one embodiment, substrate 240 includes a plurality of etch stops 249 positioned between etch stops 248. Etch stops 249 are positioned so as to prevent etching of a portion of substrate 240 opposite resistor 238. As such, etch stops 249 and portions of substrate 240 between etch stops 249 define a membrane or support structure for a portion of thin-film structure 232 and firing resistor 238. Thus, etch stops 249 provide mechanical support to maintain a rigid membrane under thin-film structure 232 and firing resistor 238 and provide a heat dissipation mechanism for thin-film structure 232 and firing resistor 238**.

Figure 10:
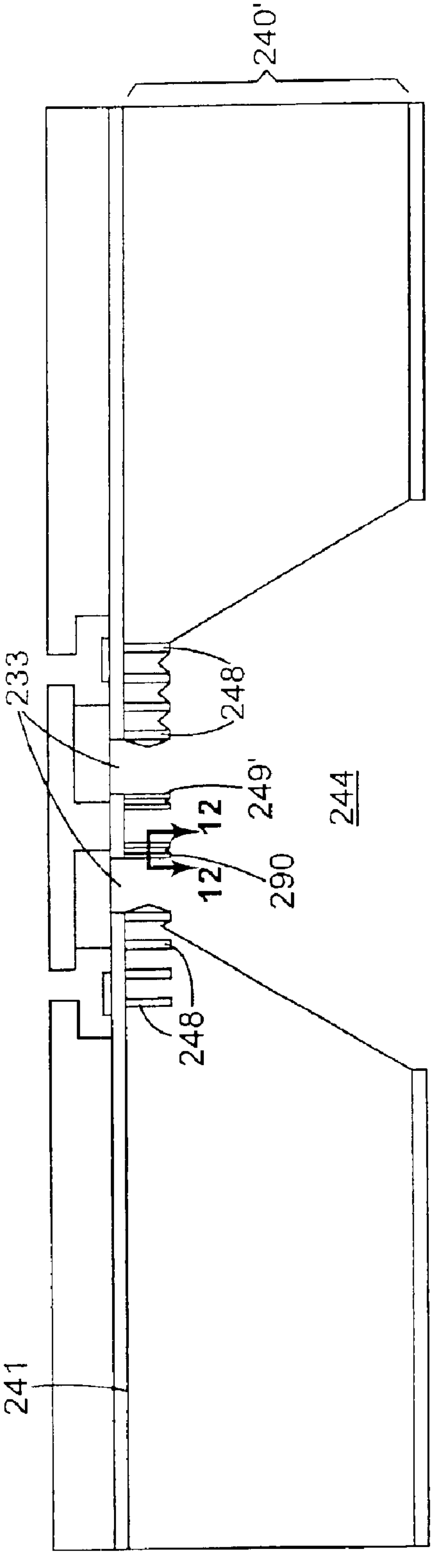
FIG. 10 is a schematic cross-sectional view illustrating another embodiment of a substrate including one embodiment of particle tolerant architecture according to the present invention.
Figure 11:
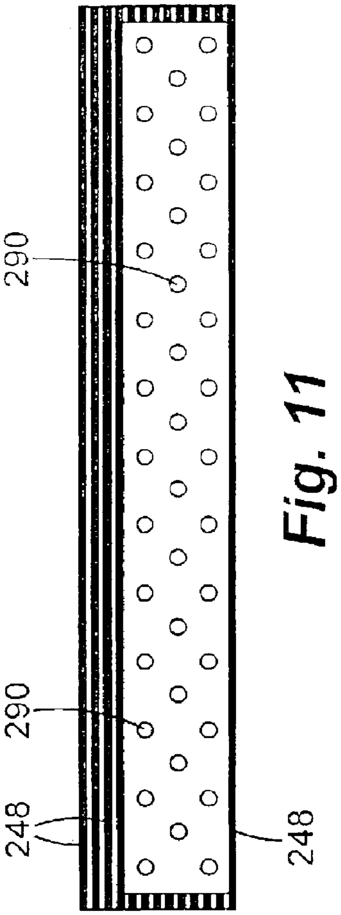
FIG. 11 is a schematic bottom view of a portion of the substrate of FIG. 10.

FIGS. 10 and 11 illustrate another embodiment of substrate 240. Substrate 240' may support, for example, drop ejecting elements 130 (FIG. 3) or 230 (FIG. 8), as described above. Substrate 240', similar to substrate 240, includes etch stops 248 which define and control formation of fluid feed slot 244 in substrate 240' and includes one or more etch stops 249' positioned between etch stops 248. Etch stops 249' are formed in substrate 240' in a manner similar to that described above.

Preferably, individual etch stops 249' are formed in substrate 240 and spaced along first side 241. As such, etch stops 249' form a particle tolerant architecture for substrate 240'. More specifically, etch stops 249' are spaced to allow fluid to flow therebetween and into fluid feed channels 233 while preventing foreign particles from flowing into fluid feed channels 233. Such particles include, for example, dust particles and fibers. Such particles, if allowed to enter fluid feed channels 233, may affect a performance of drop ejecting elements 130 or 230 by, for example, blocking, either wholly or partially, nozzle openings 136 or 236, respectively.

Figure 12A:
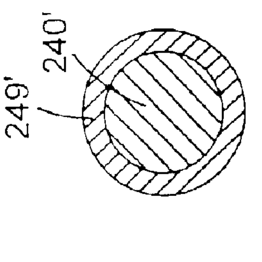
FIG. 12A is a cross-sectional view taken along line 12—12 of FIG. 10 illustrating one embodiment of a particle tolerant post according to the present invention.
Figure 12B:
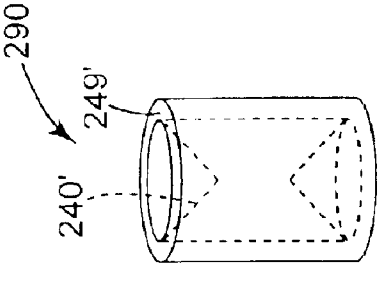
FIG. 12B is a perspective view of the particle tolerant post of FIG. 12A.

In one embodiment, as illustrated in FIGS. 12A and 12B, etch stops 249' are formed by etching annular or ring-shaped slots into substrate 240'. Thereafter, etch resistant material, as described above, is disposed in the annular or ring-shaped slots. As such, substantially cylindrical-shaped portions of substrate 240' are surrounded by annular or ring-shaped etch stops 249'. Thus, etch stops 249' and portions of substrate 240' surrounded by etch stops 249' define particle tolerant posts 290 of the particle tolerant architecture for substrate 240'.

Figure 14:
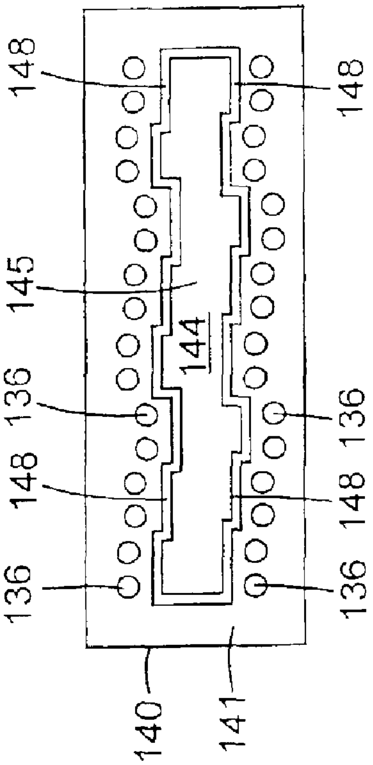
FIG. 14 is a schematic top view illustrating another embodiment of a portion of a fluid slot for a fluid ejection device according to the present invention.
Figure 13:
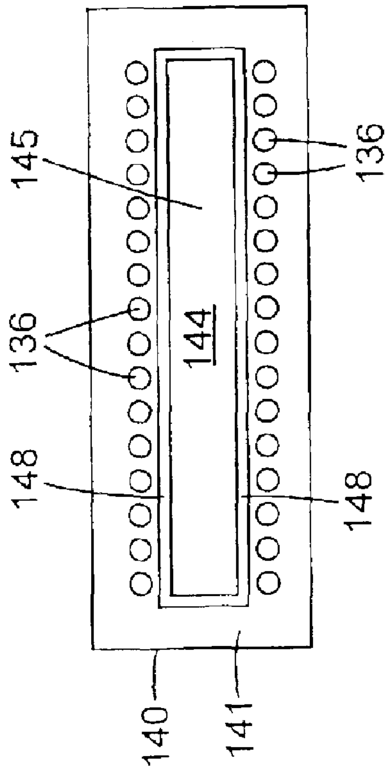
FIG. 13 is a schematic top view illustrating one embodiment of a portion of a fluid slot for a fluid ejection device according to the present invention.

FIGS. 13 and 14 each illustrate one embodiment of fluid feed slot 144 formed through substrate 140 (including substrates 140' and 140") according to the present invention. As illustrated in the embodiment of FIG. 13, etch stops 148 define substantially parallel sides of first portion 145 of fluid feed slot 144 at first side 141 of substrate 140. More specifically, etch stops 148 are spaced to form substantially parallel opposing sides of fluid feed slot 144 with substantially straight profiles along first side 141. As such, nozzle openings 136 (and firing resistors 138) are arranged in substantially parallel columns so as to follow the substantially parallel sides of first portion 145 of fluid feed slot 144. As illustrated in the embodiment of FIG. 14, etch stops 148 define substantially parallel, staggered sides of first portion 145 of fluid feed slot 144 at first side 141 of substrate 140. More specifically, etch stops 148 are spaced with a stair-step or step-like offset to form substantially parallel opposing sides of fluid feed slot 144 with staggered profiles along first side 141. As such, nozzle openings 136 (and firing resistors 138) are arranged in substantially parallel, staggered columns so as to follow the substantially parallel, staggered sides of first portion 145 of fluid feed slot 144.

While the above description refers to the inclusion of substrate 160 having opening 150 formed therein in an inkjet printhead assembly, as one embodiment of a fluid ejection assembly of a fluid ejection system, it is understood that substrate 160 having opening 150 formed therein may be incorporated into other fluid ejection systems including non-printing applications or systems as well as other applications having fluidic channels through a substrate, such as medical devices. Accordingly, the present invention is not limited to printheads, but is applicable to any slotted substrates. In addition, while the above description refers to routing fluid or ink through opening 150 of substrate 160, it is understood that any flowable material, including a liquid such as water, ink, blood, photoresist, or organic light-emitting materials or flowable particles of a solid such as talcum powder or a powdered drug, may be fed or routed through opening 150 of substrate 160.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of forming an opening through a substrate having a first side and a second side opposite the first side, the method comprising:

extending spaced etch stops into the substrate from the first side;

etching into the substrate between the spaced etch stops, including forming a first portion of the opening; and etching into the substrate from the second side toward the first side to the spaced etch stops, including forming a second portion of the opening, wherein etching into the substrate and forming the second portion of the opening includes terminating the second portion of the opening with the spaced etch stops.

2. The method of claim 1, wherein forming the first portion of the opening includes forming the first portion of the opening between the spaced etch stops, and wherein forming the second portion of the opening includes forming the second portion of the opening to the speed etch stops.

3. The method of claim 1, wherein extending the spaced etch stops into the substrate includes forming spaced slots in the substrate from the first side and forming the spaced etch stops in the spaced slots.

4. The method of claim 3, wherein forming the spaced slots in the substrate includes etching into the substrate from the first side.

5. The method of claim 4, wherein etching into the substrate from the first side includes dry etching into the substrate.

6. The method of claim 5, wherein dry etching into the substrate includes deep reactive ion etching into the substrate.

7. The method of claim 3, wherein the substrate is formed of silicon, and wherein forming the spaced etch stops in the spaced slots includes disposing an etch resistant material in the spaced slots.

8. The method of claim 7, wherein the etch resistant material includes one of an oxide, tungsten, oxi-nitride, and silicon nitride.

9. The method of claim 1, wherein etching into the substrate and forming the first portion and the second portion of the opening includes anisotropically wet etching into the substrate.

10. The method of claim 1, wherein etching into the substrate and forming the first portion of the opening includes etching into the substrate from the first side toward the second side between the spaced etch stops.

11. The method of claim 1, wherein etching into the substrate and forming the first portion and the second portion of the opening includes simultaneously etching into the substrate from the first side toward the second side and into the substrate from the second side toward the first side.

12. The method of claim 1, wherein etching into the substrate and forming the first portion and the second portion of the opening includes etching into the substrate from the first side toward the second side after etching into the substrate from the second side to the first side.

13. The method of claim 1, wherein extending the spaced etch stops into the substrate includes orienting the spaced etch stops substantially perpendicular to the first side of the substrate.

14. The method of claim 1, wherein extending the spaced etch stops into the substrate includes defining a maximum dimension of the first portion of the opening.

15. The method of claim 14, wherein extending the spaced etch stops into the substrate further includes defining a minimum dimension of the second portion of the opening.

16. The method of claim 1, wherein extending the spaced etch stops into the substrate includes defining substantially parallel sides of the first portion of the opening along the first side of the substrate.

17. The method of claim 1, wherein extending the spaced etch stops into the substrate includes defining substantially parallel, staggered sides of the first portion of the opening along the first side of the substrate.

18. The method of claim 1, wherein extending the spaced etch stops into the substrate includes extending a first plurality of etch stops into the substrate from the first side and extending a second plurality of etch stops spaced from the first plurality of etch stops into the substrate from the first side.

19. The method of claim 1, wherein extending the spaced etch stops into the substrate includes extending a pair of spaced etch stops into the substrate from the first side and extending at least one etch stop into the substrate from the first side between the pair of spaced etch stops.

20. A method of forming a substrate for a fluid ejection device, the method comprising:

forming spaced slots in the substrate from a first side;

forming spaced etch stops in the spaced slots;

etching a first portion of a fluidic channel into the substrate between the spaced etch stops; and etching a second portion of the fluidic channel into the substrate from a second side opposite the first side to the spaced etch stops.

21. The method of claim 20, wherein forming the spaced slots in the substrate includes etching into the substrate from the first side.

22. The method of claim 21, wherein etching into the substrate from the first side includes dry etching into the substrate.

23. The method of claim 22, wherein dry etching into the substrate includes deep reactive ion etching into the substrate.

24. The method of claim 20, wherein the substrate is formed of silicon, and wherein forming the spaced etch stops in the spaced slots includes disposing an etch resistant material in the spaced slots.

25. The method of claim 24, wherein the etch resistant material includes one of an oxide, tungsten, oxi-nitride, and silicon nitride.

26. The method of claim 20, wherein etching the first portion and the second portion of the fluidic channel into the substrate includes anisotropically wet etching into the substrate.

27. The method of claim 20, wherein etching the first portion of the fluidic channel into the substrate includes etching the first portion of the fluidic channel into the substrate from the first side between the spaced etch stops.

28. The method of claim 20, wherein etching the second portion of the fluidic channel into the substrate includes terminating the second portion of the fluidic channel with the spaced etch stops.

29. The method of claim 20, wherein etching the first portion and the second portion of the fluidic channel into the substrate includes simultaneously etching the first portion of the fluidic channel into the substrate from the first side and the second portion of the fluidic channel into the substrate from the second side.

30. The method of claim 20, wherein etching the first portion and the second portion of the fluidic channel into the substrate includes etching the first portion of the fluidic channel into the substrate from the first side after etching the second portion of the fluidic channel into the substrate from the second side.

31. The method of claim 20, wherein forming the spaced slots in the substrate includes orienting the spaced slots substantially perpendicular to the first side of the substrate.

32. The method of claim 20, wherein forming the spaced etch stops includes defining a maximum dimension of the first portion of the fluidic channel.

33. The method of claim 32, wherein forming the spaced etch stops further includes defining a minimum dimension of the second portion of the fluidic channel.

34. The method of claim 20, wherein forming the spaced slots in the substrate includes defining substantially parallel sides of the first portion of the fluidic channel along the first side of the substrate.

35. The method of claim 34, further comprising:

forming a plurality of drop ejecting elements on the first side of the substrate, including arranging the drop ejecting elements in substantially parallel columns and following the substantially parallel sides of the first portion of the fluidic channel.

36. The method of claim 20, wherein forming the spaced slots in the substrate includes defining substantially parallel, staggered sides of the first portion of the fluidic channel along the first side of the substrate.

37. The method of claim 36, further comprising:

forming a plurality of drop ejecting elements on the first side of the substrate, including arranging the drop ejecting elements in substantially parallel, staggered columns and following the substantially parallel, staggered sides of the first portion of the fluidic channel.

38. The method of claim 20, wherein forming the spaced slots in the substrate includes forming a first plurality of slots and a second plurality of slots spaced from the first plurality of slots in the substrate, and wherein forming the spaced etch stops includes forming a first plurality of etch stops in the first plurality of spaced slots and a second plurality of etch stops in the second plurality of spaced slots.

39. The method of claim 20, wherein forming the spaced slots in the substrate includes forming a pair of spaced slots and at least one slot between the pair of spaced slots in the substrate, and wherein forming the spaced etch stops includes forming a pair of spaced etch stops in the pair of spaced slots and an etch stop in the at least one slot between the pair of spaced slots.

* * * * *